Dec. 29, 1964  E. W. ROBERTSON  3,162,901
DEVICE FOR PROTECTING TIRE CASINGS FROM
THE HINGES OF COLLAPSIBLE RIMS
Filed May 14, 1962  2 Sheets-Sheet 1
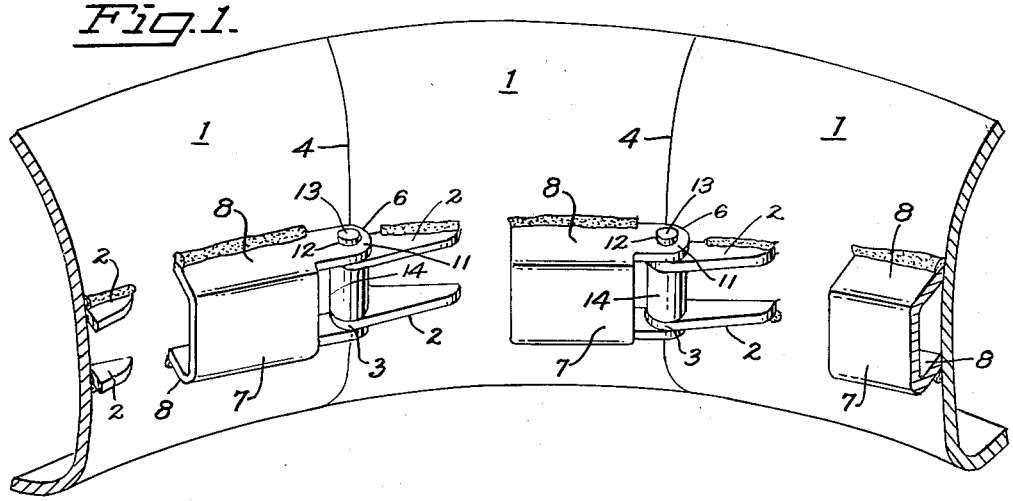
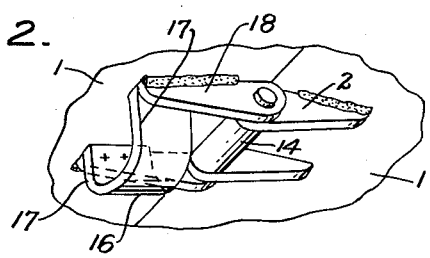
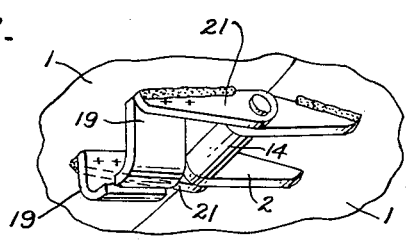
INVENTOR.
ELMER W. ROBERTSON
BY George B. White
ATTORNEY

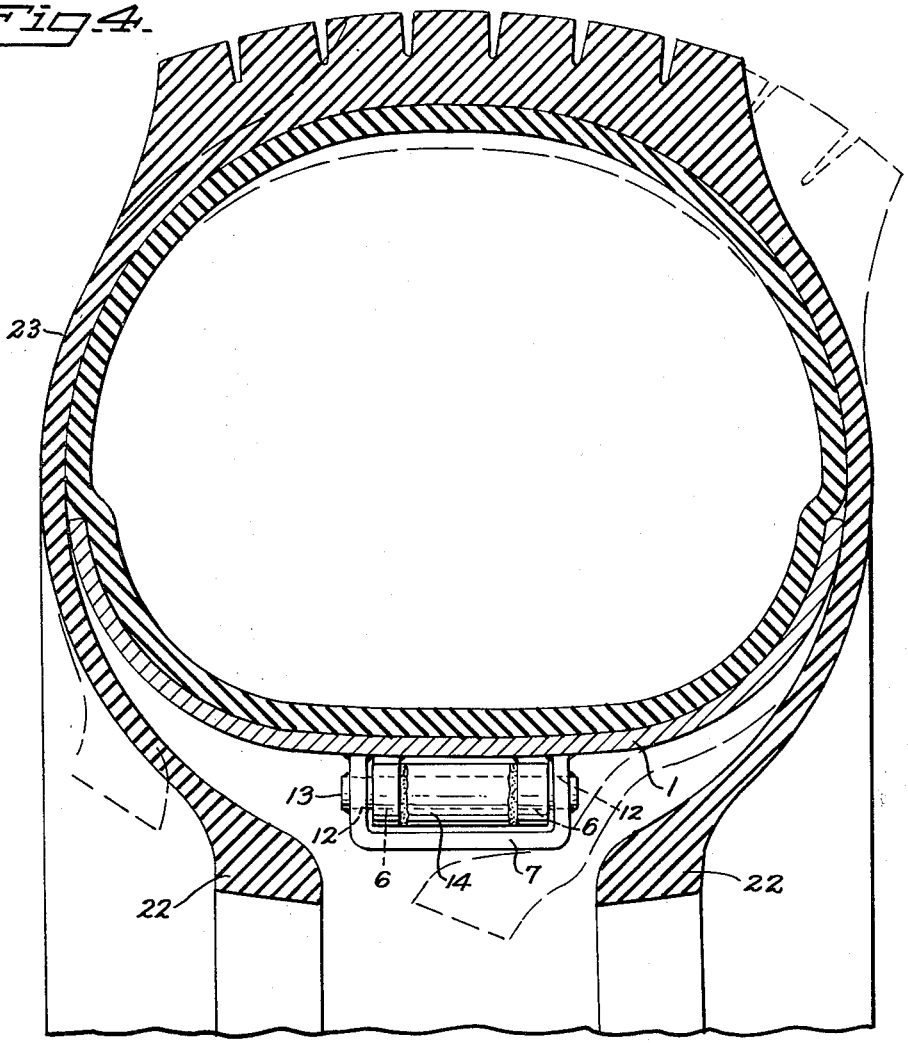

United States Patent Office 3,162,901
Patented Dec. 29, 1964

1

3,162,901
DEVICE FOR PROTECTING TIRE CASINGS FROM THE HINGES OF COLLAPSIBLE RIMS
Elmer W. Robertson, Oakland, Calif., assignor to Elrick Industries, Inc., Oakland, Calif., a corporation of California
Filed May 14, 1962, Ser. No. 194,592
2 Claims. (Cl. 18—45)

This invention relates to a device for protecting tire casings from the hinges of collapsible rims.

Collapsible rims are used at the present time in treading or retreading tire casings for the purpose of holding the so-called curing tube within the tire casing. Such collapsible rims are made of sections which are connected to one another by hinges which project from the inner periphery of the collapsible rim. The collapsible rim is usually collapsed and then inserted in the tire casing and expanded so that its concave outer periphery faces toward, and ultimately receives or nests the curing tube within the tire casing. Usually means are provided in such machinery to engage and press together the beads of the tire casing thereby to reduce the outer diameter of the tire casing and facilitate removal of the tire casing from the usual matrix.

In recently developed practice one bead of the tire casing is completely released and the other bead is pushed under and inwardly of the collapsible rim. As the bead is so folded or wrapped under the inside periphery of the collapsible rim it is pressed and drawn against the edges of the projecting hinge brackets or hinge elements of the collapsible rim and the tire casing is very frequently damaged.

The primary object of the invention is to provide means for protecting the inside of the tire casing against direct contact with the hinge elements thereby to prevent damage to the tire casing.

An object of the invention is to achieve this novel result of protecting the tire casing against damage on the hinge elements of a collapsible rim, by the step and means for spacing and guiding the inner periphery of the tire casing away from the edges or corners of the hinge brackets or hinge elements of the collapsible rim.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a fragmental perspective view of the convex side of the sectional collapsible rim with the hinge guard thereon.

FIG. 2 is a fragmental perspective view of the sectional collapsible rim with a modified form of hinge guard.

2

FIG. 3 is a fragmental perspective view of the sectional collapsible rim with another modified form of hinge guard.

FIG. 4 is a cross-sectional view showing a tire casing on the sectional rim and indicating in broken lines the position of the tire casing wrapped under the convex side of the rim.

In FIG. 1 are shown collapsible adjacent alternate rim sections 1. In this form a pair of spaced tapering hinge lugs 2 extend so that the wider or larger ends 3 of the lugs 2 project beyond the adjacent end 4 of the respective rim section 1. A pivot hole 6 in the large end 3 of each lug 2 is so located that the center line or pivot axis through the holes 6 is in registry with the adjacent edge 4 of the respective rim section 1.

On the coacting end of the next adjacent rim section 1 is provided a spacing guide 7. This spacing guide 7 is a transverse plate which is spaced above the level of the largest end 3 of the lugs 2. The spacing guide 7 is substantially U-shaped cross-section and the legs 8 thereof are solidly welded to the inner periphery of the respective rim section 1. Each leg 8 extends toward the adjacent end 4 of the inner periphery of the rim section 1 so as to form spaced pivot brackets 11 with holes 12 therein registerable with the holes 6 of the lugs 2. A pivot pin 13 is suitably secured in the holes 12. The lugs 2 are turnable on the pivot pin 13. A spacer bushing 14 between the holes 6 of the lugs 2 prevents lateral shifting of the elements on the pivotal pin 13.

In the modified form of this invention shown in FIG. 2 the spacing guide 16 on the rim section 1 is provided in connection with the old-fashioned pivot or hinge arrangement. Namely, a generally arcuate plate of U-shaped cross-section is welded as its legs or free ends 17 to the inner sides of the adjacent lugs 18 of the hinge structure on the rim section 1. In other respects the operation of this guide is the same as the guide shown in the first embodiment.

Another modified embodiment is shown in FIG. 3 in which instead of a continuous U-shaped guide member, a guide wing 19 is extended from each lug 21 on the rim section 1 at a curvature so that the inner ends of guide wing 9 are spaced from one another, as shown.

The hinge elements alternate, namely the lugs 2 are provided on one end of each section, and hinge elements with guides thereon are provided on the other end of each rim section so as to provide at the meeting edges of adjacent sections the combination of hinge elements shown on FIG. 1.

As the tire bead 22 of the tire casing 23 is pushed or wrapped under the concave or inside periphery of the collapsible rim as shown in broken lines in FIG. 4, the bead 22 and the inner periphery of the tire casing 23 rides on the guides 7, 16, or 19 respectively and thus it is spaced above the corners of the hinge lugs. In this manner damage to the tire casing is positively obviated.

I claim:

1. In a collapsible sectional curing rim for tire casings in curing molds,
   (a) a plurality of circumferential rim sections complementing each other end to end into a circular rim,
   (b) coacting hinge means on adjacent ends of adjacent sections including a pivot pin hingedly connecting said hinge means, (c) a tire bead guide projecting from one of said hinge means radially inwardly of the respective rim section and beyond said hinge means and said pivot pin for spacing the tire bead from said hinge means and said pivot pin.

2. In a collapsible sectional curing rim for tire casings in curing molds,
   (a) a plurality of rim sections complementing each other end to end into a full circle rim,
   (b) a hinge bracket formed on the inner periphery of an end of each section,
   (c) a tire bead guide of generally U-shaped cross-section projecting radially inwardly from the inner periphery and at the other end of each section.
   (d) hinge means extended from said guide to said hinge bracket on the adjacent end of the adjacent rim section,
   (e) a hinge pin pivotally connecting said hinge means and said hinge bracket,
   (f) said guide forming a smooth shield and projecting radially inwardly beyond the level of said bracket and said pivot pin thereby to space the tire bead from said hinge bracket and said pin as the tire is put on or removed from said rim.

References Cited by the Examiner

UNITED STATES PATENTS

| | | | |
|---|---|---|---|
| 1,862,655 | 6/32 | Bostwick | 156—417 |
| 1,948,035 | 2/34 | Johnson | 156—417 |
| 2,322,546 | 1/43 | Sepin | 16—128 |
| 2,480,578 | 8/49 | Hodges | 18—18 |
| 2,513,482 | 7/50 | Heintz | 18—18 |
| 2,724,861 | 11/55 | Cox et al. | 18—45 |
| 2,817,877 | 12/57 | Fannen | 18—45 |
| 2,940,124 | 6/60 | Branick | 18—45 |
| 2,968,839 | 1/61 | Nester | 18—45 |
| 2,985,917 | 5/61 | Sunday | 18—43 |
| 2,988,780 | 6/61 | Dennis et al. | 18—45 |
| 2,995,178 | 8/61 | Saulino et al. | 156—110 |
| 3,047,450 | 7/62 | Drakeford et al. | 156—110 |

FOREIGN PATENTS 220,225  2/59  Australia.

MICHAEL V. BRINDISI, *Primary Examiner.*

HAROLD ANSHER, CHARLES W. LANHAM,
*Examiners.*